(12) United States Patent
Wakiyama et al.

(10) Patent No.: US 6,940,274 B2
(45) Date of Patent: Sep. 6, 2005

(54) MAGNETIC POSITION DETECTING DEVICE

(75) Inventors: Koji Wakiyama, Yokohama (JP); Yutaka Kamogi, Yonago (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 91 days.

(21) Appl. No.: 10/430,982

(22) Filed: May 7, 2003

(65) Prior Publication Data

US 2004/0075426 A1 Apr. 22, 2004

(30) Foreign Application Priority Data

May 8, 2002 (JP) .................................... P. 2002-132795

(51) Int. Cl.[7] .......................... G01R 33/025; G01B 7/14
(52) U.S. Cl. .............................. 324/207.12; 324/207.2; 324/207.21; 324/207.24
(58) Field of Search ...................... 324/207.21, 207.26, 324/207.2, 207.12, 207.24, 252, 166, 173, 174; 338/32 H, 32 R; 257/426, E43.003

(56) References Cited

U.S. PATENT DOCUMENTS 5,497,084 A * 3/1996 Bicking .................. 324/207.25
5,530,345 A * 6/1996 Murari et al. ............. 324/207.2

FOREIGN PATENT DOCUMENTS

| JP | 62218801 A | * 9/1987 | ............ G01B/7/30 |
| JP | 5-26604 | 2/1993 | |

* cited by examiner

Primary Examiner—Jay Patidar
Assistant Examiner—David Schindler
(74) Attorney, Agent, or Firm—Pearne & Gordon LLP

(57) ABSTRACT

A magnetic position detecting device for detecting a position of a moving body to a fixed body on the basis of a change of a magnetic flux density that a Hall element on the fixed body senses when the moving body provided with a magnet moves relative to the fixed body. An S-pole and an N-pole of the magnet are juxtaposed along a direction of the movement. When the Hall element passes a boundary between the poles of the magnet, the sensed magnetic flux density is zero, the polarities of the magnetic field are inverted, and therefore the Hall element does not sense any variation of the position. Only when the magnet and the Hall element mutually approach, a detect signal based on the sensed magnetic flux density is compared with a reference signal. By detecting a position where both the signals are equal in level, a reference position is detected.

2 Claims, 4 Drawing Sheets

REFERENCE POSITION

MAGNETIC POSITION DETECTING DEVICE

BACKGROUND OF THE INVENTION

1. Field of the Invention

The present invention relates to a magnetic position detecting device for detecting a position of a moving body relative to a fixed body. More particularly, the invention relates to a magnetic position detecting device capable of highly accurately detecting a reference position by use of a magnetism-sensitive element, such as a Hall element or a magnetoresistive effect element.

2. Description of the Related Art

The device for detecting a position of the moving body is used in a monitoring system, for example. In the system, a monitor camera picks up an object to be monitored while being rotated in an appropriate direction. An image thus picked up is recorded or displayed on a screen of a monitor device. To know a direction of the monitor camera, a reference position (position of an origin) for the rotation of the monitor camera is determined in advance, and a quantity of angular movement of the camera (rotational angle) is detected with respect to the reference position.

A magnetic position detecting device 60 shown in FIG. 6(a) is known for the position detecting device used in the monitoring system of this type. The magnetic position detecting device 60 includes a magnet section 63 in which an S pole part 61s of a magnet 61 is bonded to a back yoke 62, and a Hall element 64 which is moved along an N pole part 61n of the magnet 61. The Hall element 64 senses a change of flux density when it moves along the N pole part 61n of the magnet 61. A relative displacement between the magnet section 63 and the Hall element 64 is detected based on the flux change sensed.

FIG. 6(b) shows a graph for explaining the principle of the position detection. Positions Pa and Pb at which a magnetic flux detected by the Hall element 64 is zero in density are present on a traveling path of the Hall element 64. A relative position between the moving Hall element 64 and the magnet section 63 can be detected using the position Pa or Pb as a reference.

In the monitoring system, the magnet section 63 is mounted on one of the monitor camera as the moving body and the fixed body for supporting the same, the Hall element 64 is mounted on the other. The position Pa or Pb where a magnetic flux density is zero in density is preset as a reference position, for example, an original position of rotation of a motor. A direction of the monitor camera can be known from a quantity of movement of the moving body (a quantity of rotation when the moving body is a motor) from the original position.

In the magnetic position detecting device 60, as seen from a magnetic flux density curve shown in FIG. 6(b), a density of a magnetic flux that the Hall element 64 senses when it moves along its moving path, gently varies with its lower limit being zero. Accordingly, in a curve representative of a variation of an output signal from the Hall element 64, a rise and a fall of the curve are indistinct, and the positions Pa and Pb at which the flux density is zero greatly vary, resulting in position detection errors.

To overcome the disadvantage, in a magnetic position detecting device disclosed in JP-A-5-26604, as shown in FIG. 7(a), a back yoke 62 is bent to have a shape like U. With such a structure, as shown FIG. 7(b), a magnetic field is inverted in polarity at the boundaries (neutral points between N- and S-poles) between both ends of the back yoke 62 and the magnet 61. In the magnetic position detecting device, variations of the positions Pa and Pb at which the magnetic flux density is zero are reduced. Further, those positions can clearly be detected by using the polarity inversion. Accordingly, the position detection error is greatly reduced.

However, the magnetic position detecting device is also difficult in stably detecting the positions where the magnetic flux density is zero. The reason for this follows. A voltage (voltage difference) corresponding to a magnetic flux density zero varies by variation of offset voltages of the Hall elements 64, change of an offset of an electronic circuit used for the position detecting device, ambient temperature variation and others. To cope with this, it is necessary to deviate a threshold value of detection to the positive direction by a voltage value corresponding to those variations. Otherwise, the positions of the flux density zero which are located far apart from the magnet 61 will erroneously be detected as the correct ones. For this reason, the threshold value of the detection must be deviated. As a result, the detection positions are affected by variations of the power source voltage, magnetic force of the magnet, ambient temperature and others. Accordingly, the position detected is shifted from the reference position for the position detection as set at the manufacturing stage to thereby cause a position detection error. Resultantly, the device operation loses its normality, sometimes.

SUMMARY OF THE INVENTION

Accordingly, an object of the invention is to provide a highly accurate magnetic position detecting device which is capable of reducing the position detection error to a much lower level when comparing with the conventional magnetic position detecting device, and minimizing the position detection error caused by variation of the power source voltage to the magnetism-sensitive element for detecting a magnetic flux, such as the Hall element or magnetoresistive effect element, change of magnetic force of the magnet, ambient temperature variation and others.

To achieve the above object, there is provided a magnetic position detecting device in which a magnet is mounted on one of a fixed body and a moving body, and a magnetism-sensitive element is mounted on the other of the fixed body and the moving body and a position of the moving body to the fixed body is detected based on a change of a magnetic flux density that the magnetism-sensitive element senses. In the magnetic position detecting device, an S-pole and an N-pole of the magnet 6 are juxtaposed along a direction in which the magnet and the magnetism-sensitive element move relatively to each other. The magnetic position detecting device comprises: a reference signal generating circuit for generating a signal for detecting a position at which a magnetic flux density that the magnetism-sensitive element senses is zero; a comparing circuit for comparing a detect signal which depends on an output signal of the magnetism-sensitive element, with the reference signal, and for producing a reference position detect signal of a predetermined level when the detect signal and the reference signal are equal in level; and a comparing signal control circuit for controlling the detect signal or the reference signal to be input to the comparing circuit so that the reference position detect signal of a predetermined level is output only during a fixed period that the magnet and the magnetism-sensitive element mutually approach.

In a preferred embodiment, the reference signal generating circuit produces a signal having a level equal to an average level of an output signal of the magnetism-sensitive element, in the form of the reference signal.

As described above, an S-pole and an N-pole of the magnet are juxtaposed along a direction in which the magnet and the magnetism-sensitive element move relatively to each other. The magnetism-sensitive element passes a boundary position between the S-pole and the N-pole of the magnet. When it passes the boundary position, a magnetic flux density that the magnetism-sensitive element senses is zero. The polarities of the magnetic field are completely inverted from the N-pole to the S-pole and vice versa. Therefore, a variation of the position where the magnetic flux density sensed by the magnetism-sensitive element is zero is completely eliminated.

Accordingly, in the invention, the comparing circuit compares a detect signal which depends on a magnetic flux density sensed by the magnetism-sensitive element, with a reference signal generated by the reference signal generating circuit, and when those signals are equal in level, the comparing circuit produces a reference position detect signal of a predetermined level. With this feature, the magnetic position detecting device can considerably accurately detect a position at which a magnetic flux density sensed by the magnetism-sensitive element is zero, viz., a reference position. Further, the comparing signal control circuit for controlling the detect signal or the reference signal to be input to the comparing circuit so that the reference position detect signal of a predetermined level is output only during a fixed period that the magnet and the magnetism-sensitive element mutually approach. Therefore, there is no chance that the magnetic position detecting device detects a position of the flux density zero which is located far apart from the magnet, erroneously as the correct ones.

A signal having a level equal to an average level of an output signal of the magnetism-sensitive element, is used for the reference signal. Accordingly, even when the power source voltage of the magnetism-sensitive element varies, the magnetic force of the magnet changes, and ambient temperature varies, the reference signal may be varied in association with those conditional variations. Accordingly, high position detection accuracy is maintained.

BRIEF DESCRIPTION OF THE DRAWINGS

FIG. 6($b$) is a graph showing a relation between a magnetic flux density that the Hall element senses in the magnetic position detecting device of FIG. 6($a$) and position of a Hall element.

FIG. 7($b$) is graph showing a relation between a magnetic flux density that the Hall element senses in the magnetic position detecting device of FIG. 7($a$) and position of a Hall element.

DESCRIPTION OF THE PREFERRED EMBODIMENTS

The preferred embodiments of the present invention will be described with reference to the accompanying drawings.

Figure 1:
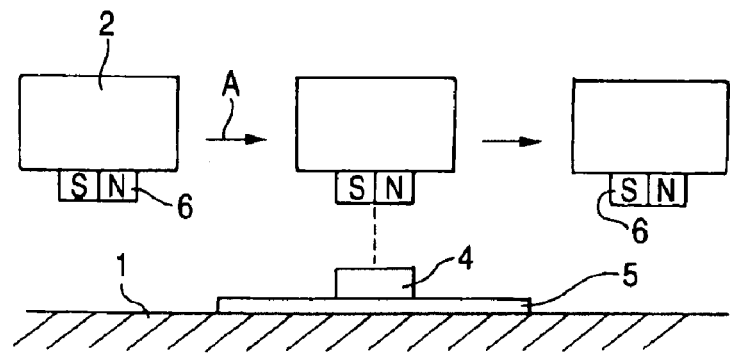
FIG. 1 is a diagram for explaining a configuration of a magnetic position detecting device according to an embodiment of the present invention.

FIG. 1 is a diagram for explaining a configuration of a magnetic position detecting device according to an embodiment of the present invention. In FIG. 1, a moving body 2 moves along and parallel to a fixed body 1. The magnetic position detecting device includes a Hall element 4 and a circuit board 5, which are mounted on the fixed body 1, and a magnet 6 mounted on the moving body 2. In the figure, an arrow A indicates a moving direction of the moving body 2.

The Hall element 4 is mounted on the circuit board 5, and is fixed to the fixed body 1 through the circuit board 5, while being faced to a moving path of the magnet 6. A position detecting circuit to be described later is formed on the circuit board 5. The magnet 6 is fixed onto a surface of the moving body 2, which faces the fixed body 1, such that an N-pole of the magnet is directed to the downstream side in the moving direction of the moving body 2, while an S-pole is directed to the upstream side.

Figure 2:
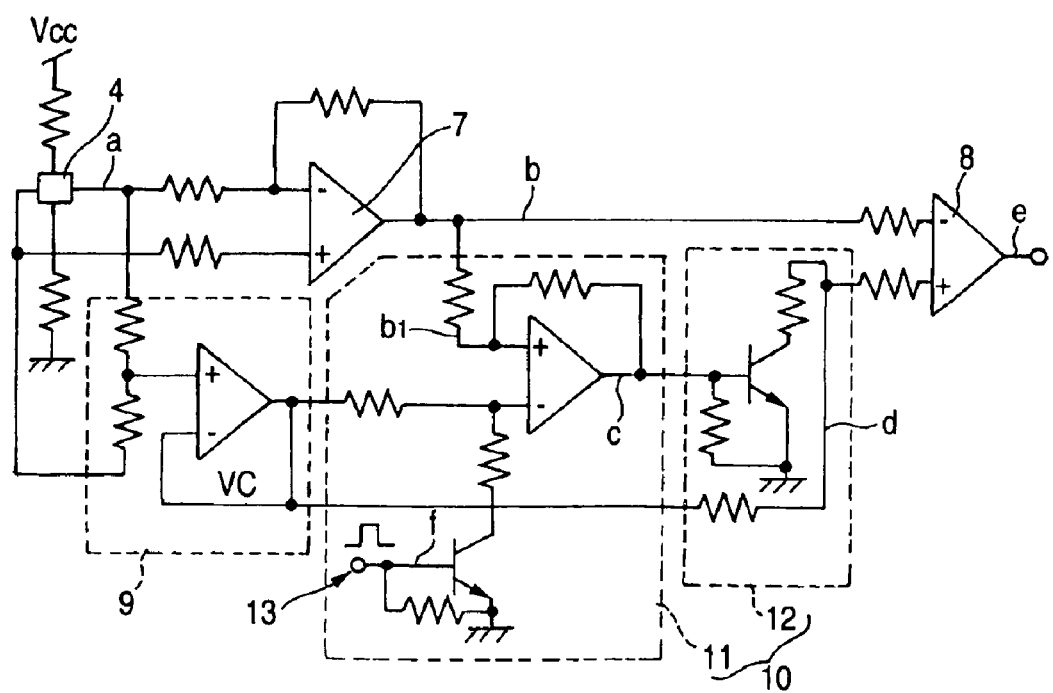
FIG. 2 is a circuit diagram showing a circuit configuration of a position detecting circuit of the magnetic position detecting device of the first embodiment of the invention.
Figure 3:
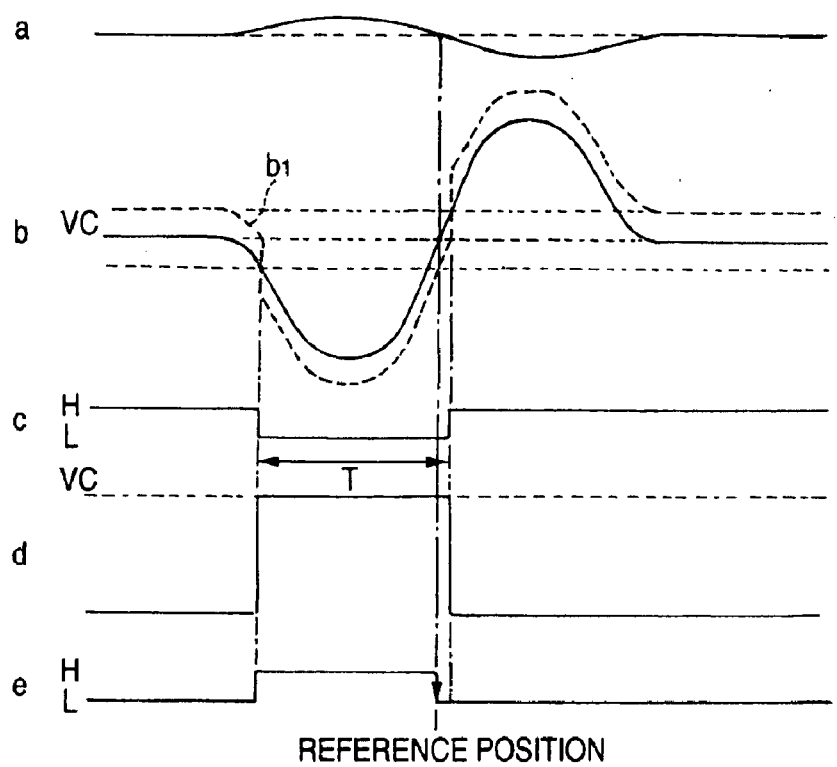
FIG. 3 is a waveform diagram showing waveforms of signals at related positions in the position detecting circuit shown in FIG. 2.

FIG. 2 is a circuit diagram showing a circuit configuration of a position detecting circuit of the magnetic position detecting device of the first embodiment of the invention. FIG. 3 is a waveform diagram showing waveforms of signals at related positions in the position detecting circuit shown in FIG. 2.

As shown in FIG. 2, the Hall element 4 is driven by a power source voltage Vcc. An output signal "a" of the Hall element 4 is input to an inverting amplifier circuit 7. The inverting amplifier circuit 7 phase-inverts the output signal "a" of the Hall element 4 and amplifies it, and outputs the amplified one as a detect signal "b". The detect signal "b" is input to an inverting input terminal of a comparing circuit 8.

The output signal "a" of the Hall element 4 is also input to a reference signal generating circuit 9. The reference signal generating circuit 9 receives a mid-voltage of a voltage between both the output terminals of the Hall element 4. The reference signal generating circuit produces a reference signal VC which is in an average level of the output signal "a" of the Hall element 4 and in phase with the detect signal "b". The reference signal VC is input to a comparing signal control circuit 10.

The comparing signal control circuit 10 includes a window signal generating circuit 11 and a threshold value setting circuit 12. The window signal generating circuit 11 compares a window detection signal b1, which is formed by voltage dropping the detect signal "b" by a predetermined voltage, with the reference signal VC. The window signal generating circuit produces a window signal "c" which continues a low level for a fixed period T from a time point that those voltages are equal in value to each other. The fixed period T is determined in consideration of a moving speed of the moving body 2 and a distance from a front end of the magnet 6 as viewed in the moving direction to a boundary between the N- and S-poles thereof. The window signal generating circuit 11 is initialized by a pulse signal "f" input to an input terminal 13 before a control circuit (not shown) of a device attached to the magnetic position detecting device starts a reference position detection (original point search).

The threshold value setting circuit 12 receives the window signal "c" and the reference signal VC. The threshold value setting circuit 12 outputs a threshold value signal "d" which is equal in level to the reference signal VC only during a low-level period of the window signal "c", and outputs a threshold value signal "d" which is much lower in level than the reference signal VC during other periods than the low level period. The threshold value signal "d" is input to the non-inverting input terminal of the comparing circuit 8.

The comparing circuit 8 compares the detect signal "b" with the threshold value signal "d", and when both the signals are equal in level, it produces a position detection signal "e" of a given level. In this instance, the position detection signal "e" goes high in level at the instant that the window signal generating circuit 11 is initialized by the pulse signal "f". When both the signals are equal in level, the position detection signal goes low in level.

In the magnetic position detecting device thus constructed, the magnet 6 is disposed such that the N-pole of the magnet 6 is directed in the moving direction of the moving body 2, while the S-pole is directed in the opposite direction of the former. Accordingly, the Hall element 4 passes a boundary between the S-pole and the N-pole. When it passes the boundary, a magnetic flux density sensed by the Hall element 4 is zero and further the polarity of the magnetic field is completely inverted from the N-pole to the S-pole. Accordingly, a variation of the position where the magnetic flux density sensed by the Hall element 4 is zero is completely eliminated.

Accordingly, the comparing circuit 8 compares the detect signal "b" which depends on the magnetic flux density sensed by the Hall element 4 with the threshold value signal "d" equal in level to that reference signal VC, and when those signals are equal in level, it produces a position detection signal "e" of low level. Accordingly, the position at which the magnetic flux density sensed by the Hall element 4 is zero, i.e., the reference position, is extremely accurately detected.

Further, the threshold value signal "d" is equal in level to the reference signal VC during the period T that the window signal "c" is low in level, viz., only during a fixed period T immediately after the magnet 6 approaches the Hall element, and the output signal "a" of the Hall element 4 starts to vary. During other periods than the period, the threshold value signal is much lower in level than the reference signal VC. Therefore, the magnetic position detecting device can detect only a position of the flux density zero, which appears during the fixed period T that the magnet 6 and the Hall element 4 mutually approach. Accordingly, there is no chance that the position of the flux density zero, which is located apart from the magnet 6, is detected erroneously as the reference position.

Further, the signal having a level equal to an average level of the output signal "a" of the Hall element 4 is used for the reference signal VC. Accordingly, even when the power source voltage Vcc of the Hall element 4 varies, the magnetic force of the magnet 6 changes, and ambient temperature varies, the position detection signal "e" may be varied in association with those conditional variations. Accordingly, high position detection accuracy is maintained.

Furthermore, the magnet 6 is disposed such that one of the poles of the magnet is directed to the moving direction of the moving body 2, while the other pole is directed to the opposite direction of the former. With this feature, the magnet 6 maybe magnetized in the longitudinal direction. Therefore, the magnet 6 may be used in a state that its permeance coefficient is large. A structure in which demagnetization of the magnet 6 is hard to occur is secured.

Figure 4:
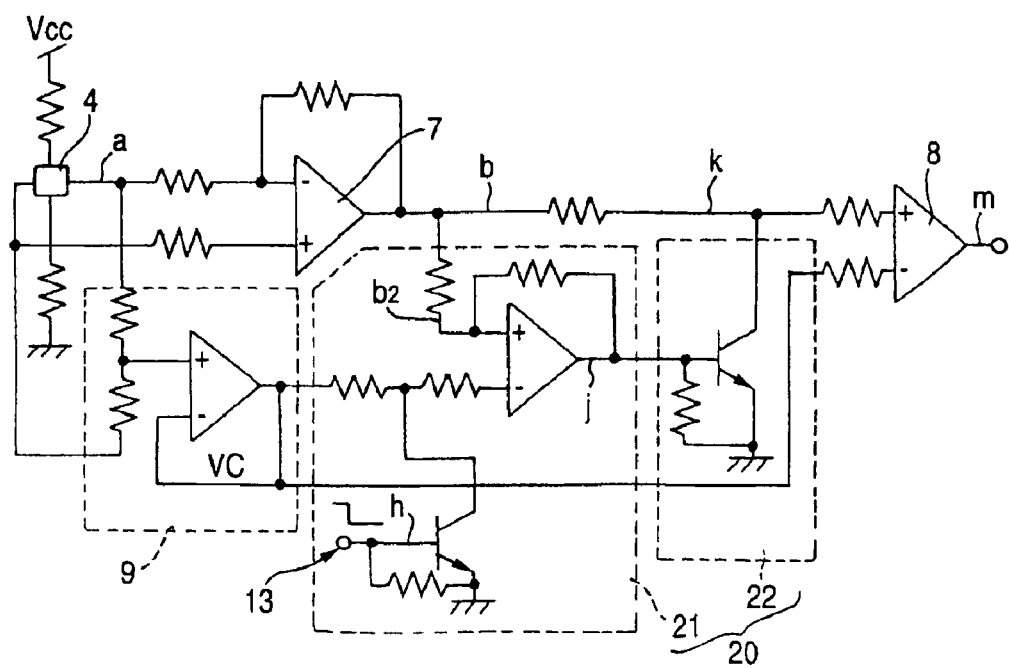
FIG. 4 is a circuit diagram showing a circuit configuration of a position detecting circuit of the magnetic position detecting device of a second embodiment of the invention.
Figure 5:
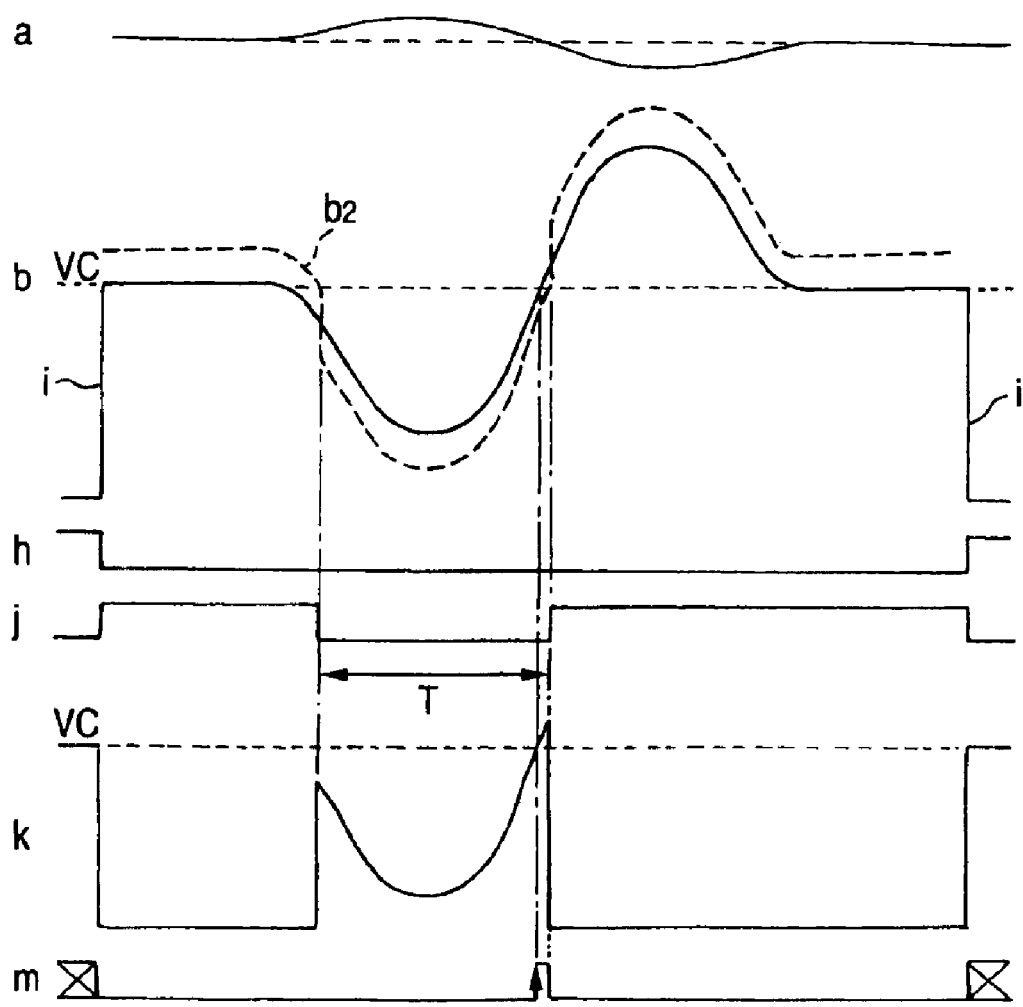
FIG. 5 is a waveform diagram showing waveforms of signals at related positions in the position detecting circuit shown in FIG. 4.
Figure 6:
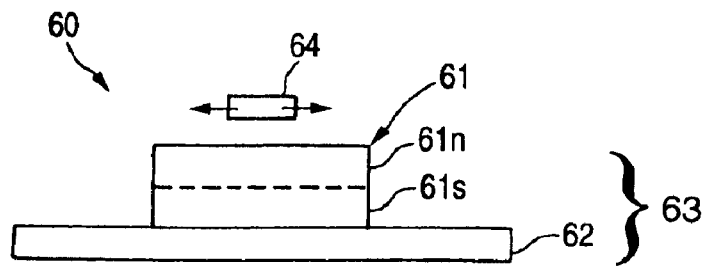
FIG. 6($a$) is a diagram for explaining a configuration of a conventional magnetic position detecting device.
Figure 6:
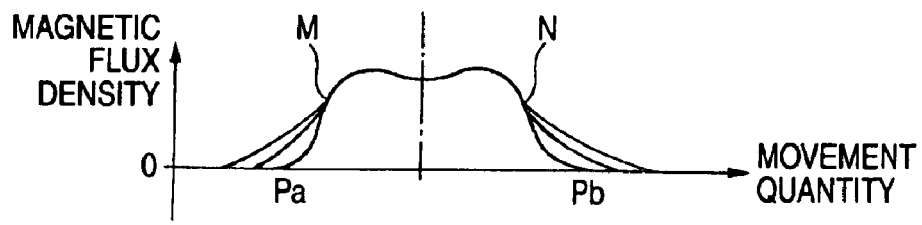
Figure 7:
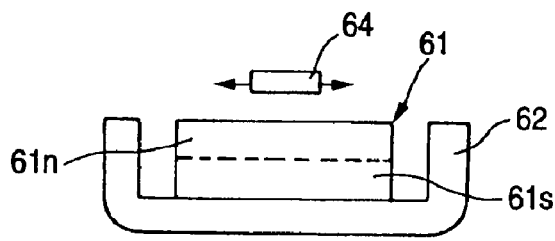
FIG. 7($a$) is a diagram for explaining a configuration of another conventional magnetic position detecting device.
Figure 7:
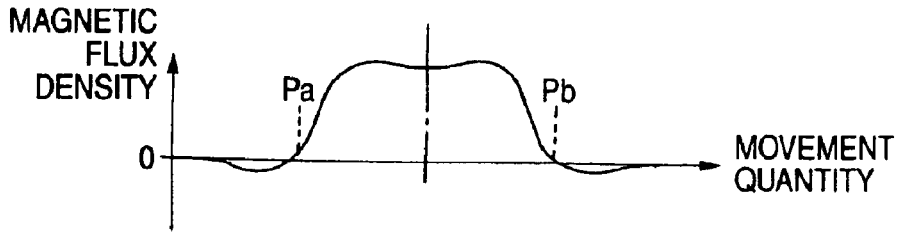

FIG. 4 is a circuit diagram showing a circuit configuration of a position detecting circuit of the magnetic position detecting device of a second embodiment of the invention. FIG. 5 is a waveform diagram showing waveforms of signals at related positions in the position detecting circuit shown in FIG. 4.

As shown in FIG. 4, the Hall element 4 is driven by a power source voltage Vcc. An output signal "a" of the Hall element 4 is input to an inverting amplifier circuit 7. The inverting amplifier circuit 7 phase-inverts the output signal "a" of the Hall element 4 and amplifies it, and outputs the amplified one as a detect signal "b". The detect signal "b" is input to an non-inverting input terminal of a comparing circuit 8.

The output signal "a" of the Hall element 4 is also input to a reference signal generating circuit 9. The reference signal generating circuit 9 receives amid-voltage of a voltage between both the output terminals of the Hall element 4. The reference signal generating circuit produces a reference signal VC which is in an average level of the output signal "a" of the Hall element 4 and in phase with the detect signal "b". The reference signal VC is input to a comparing signal control circuit 20, and also to an inverting input terminal of the comparing circuit 8.

The comparing signal control circuit 20 includes a window signal generating circuit 21 and a signal blocking circuit 22. The window signal generating circuit 21 compares a window detection signal b2, which is formed by voltage dropping the detect signal "b" by a predetermined voltage, with the reference signal VC. When both the voltages are equal in value to each other, the window signal generating circuit produces a window signal "j" which continues a low level for a fixed period T from a time point that those voltages are equal in level. The window signal generating circuit 21 is initialized by a pulse signal "h" input to an input terminal 13.

The signal blocking circuit 22 completely blocks the inputting of the detect signal "b" to the comparing circuit 8 during other periods than the period that the window signal "j" is low in level. That is, only a detect signal "k" which appears during a period that the window signal "j" is low in level, is input to the comparing circuit 8. The comparing circuit 8 compares the detect signal "k" with the reference signal VC, and when those signals are equal in level, it produces a position detection signal "m" of a given level.

Accordingly, also in the second embodiment, as in the first embodiment, the magnetic position detecting device can detect only a position of the flux density zero which appears during the low level period of the window signal "j" viz., during the fixed period T that the magnet 6 and the Hall element 4 mutually approach. Accordingly, there is no chance that the position of the flux density zero, which is located apart from the magnet 6, is detected erroneously as the reference position. Further, the magnetic position detecting device can detect the reference position during the period T, extremely accurately.

While in the embodiment mentioned above, the Hall element 4 is fixed to the fixed body 1, and the magnet 6 is fixed to the moving body 2, the magnet 6 may be fixed to the fixed body 1 and the Hall element 4 may be fixed to the moving body 2. The S-pole and the N-pole of the magnet 6 may be reversed in their positions. In this case, the waveform of the output signal "a" of the Hall element 4 is reversed right and left with respect to that in FIGS. 3 and 5.

Accordingly, the detect signal "b" and the reference signal VC must also be reversed. The Hall element may be substituted by a magnetoresistive effect element.

In the embodiments mentioned above, the moving body 2 is moved parallel to the fixed body 1. The embodiment of the invention may be applied also to a case where the moving body 2 rotates to the fixed body 1. In this case, the arrow A in FIG. 1 indicates a rotational direction. The movement position corresponds to an angular position or angle.

Accordingly, the magnetic position detecting device of the invention is capable of reducing the position detection error to a much lower level when comparing with the conventional magnetic position detecting device, and detecting a reference position extremely accurately, and further is capable of maintaining high position detection accuracy even when the power source voltage to the magnetism-sensitive element varies, the magnetic force of the magnet changes, and ambient temperature varies.

As seen from the foregoing description, the invention provides a magnetic position detecting device which is capable of reducing the position detection error to a much lower level when comparing with the conventional magnetic position detecting device, is capable of minimizing the position detection error caused by variation of the power source voltage to the magnetism-sensitive element for detecting a magnetic flux, such as the Hall element or magnetoresistive effect element, change of magnetic force of the magnet, ambient temperature variation and others, and is capable of maintaining high position detection accuracy.

What is claimed is:

1. A magnetic position detecting device in which a magnet is mounted on one of a fixed body and a moving body, and a magnetism-sensitive element is mounted on the other of said fixed body and said moving body and a position of said moving body to said fixed body is detected based on a change of a magnetic flux density that said magnetism-sensitive element senses, the improvement being characterized in that an S-pole and an N-pole of the magnet are juxtaposed along a direction in which said magnet and said magnetism-sensitive element move relatively to each other, and said magnetic position detecting device comprises:

a reference signal generating circuit for generating a reference signal for detecting a position at which said magnetism-sensitive element senses a zero magnetic flux density;

a comparing circuit for comparing a detect signal generated from an output signal of said magnetism-sensitive element, with said reference signal, and for producing a reference position detect signal of a predetermined level when said detect signal and said reference signal are equal in level; and a comparing signal control circuit for controlling said detect signal or said reference signal to be input to said comparing circuit so that said reference position detect signal of a predetermined level is output only during a fixed period while said magnet and said magnetism-sensitive element mutually approach.

2. A magnetic position detecting device according to claim 1, wherein said reference signal generating circuit produces a signal having a level equal to an average level of a plurality of output signals of said magnetism-sensitive element, in the form of said reference signal.

* * * * *